United States Patent
Gallego et al.

(10) Patent No.: US 7,825,783 B2
(45) Date of Patent: Nov. 2, 2010

(54) DEVICE FOR DETECTING AND DISPLAYING THE POSITION OF COMPONENTS OF VEHICLE COUPLINGS

(75) Inventors: José Manuel Algüera Gallego, Aschaffenburg (DE); Dirk Schmidt, Limburg (DE); Swen Saupe, Mainz (DE)

(73) Assignee: Jost-Werke GmbH & Co. KG, Frankfurt am Main (DE)

( * ) Notice: Subject to any disclaimer, the term of this patent is extended or adjusted under 35 U.S.C. 154(b) by 180 days.

(21) Appl. No.: 11/922,843

(22) PCT Filed: Jun. 30, 2006

(86) PCT No.: PCT/EP2006/006399
§ 371 (c)(1),
(2), (4) Date: Mar. 19, 2008

(87) PCT Pub. No.: WO2007/003381
PCT Pub. Date: Jan. 11, 2007

(65) Prior Publication Data
US 2008/0250882 A1      Oct. 16, 2008

(30) Foreign Application Priority Data
Jun. 30, 2005   (DE) ...................... 10 2005 031 365

(51) Int. Cl.
G08B 21/00   (2006.01)
(52) U.S. Cl. .................................. 340/431
(58) Field of Classification Search ............ 340/431, 340/686.1, 686.2, 686.6, 687, 691.6; 307/9.1; 280/433
See appcation file for complete search history.

(56) References Cited

U.S. PATENT DOCUMENTS

| 5,861,802 A | * | 1/1999 | Hungerink et al. | 340/431 |
| 6,100,794 A | * | 8/2000 | Hillier | 340/431 |
| 6,452,485 B1 | * | 9/2002 | Schutt et al. | 340/431 |
| 6,736,420 B2 | | 5/2004 | Laarman et al. | |
| 6,866,283 B2 | * | 3/2005 | Alguera et al. | 280/432 |

FOREIGN PATENT DOCUMENTS

| DE | 297 22 370 U1 | 5/1998 |
| DE | 198 20 139 A1 | 11/1999 |
| DE | 101 44 822 A1 | 3/2003 |
| DE | 102 41 904 A1 | 3/2004 |
| DE | 20 2005 005 191 U1 | 7/2005 |
| EP | 0 388 848 A2 | 9/1990 |
| EP | 1 293 363 A1 | 3/2003 |
| EP | 1 396 417 A1 | 3/2004 |

OTHER PUBLICATIONS

Response to Office Action filed Mar. 10, 2010 in co-pending U.S. Appl. No. 11/887,032 with relevant Office Action of Dec. 10, 2009.

* cited by examiner

*Primary Examiner*—Phung Nguyen
(74) *Attorney, Agent, or Firm*—Flaster/Greenberg, P.C.

(57) ABSTRACT

The invention relates to a device for detecting and for displaying the position of components of vehicle couplings comprising: a display device; having its own voltage source, and; sensor mechanisms. The displaying mechanisms can be attachable to or adjacent to the vehicle coupling. At least two sensor mechanisms are provided of which at least one mechanism is situated at a distance from the display mechanisms.

15 Claims, 7 Drawing Sheets

Figure 1:
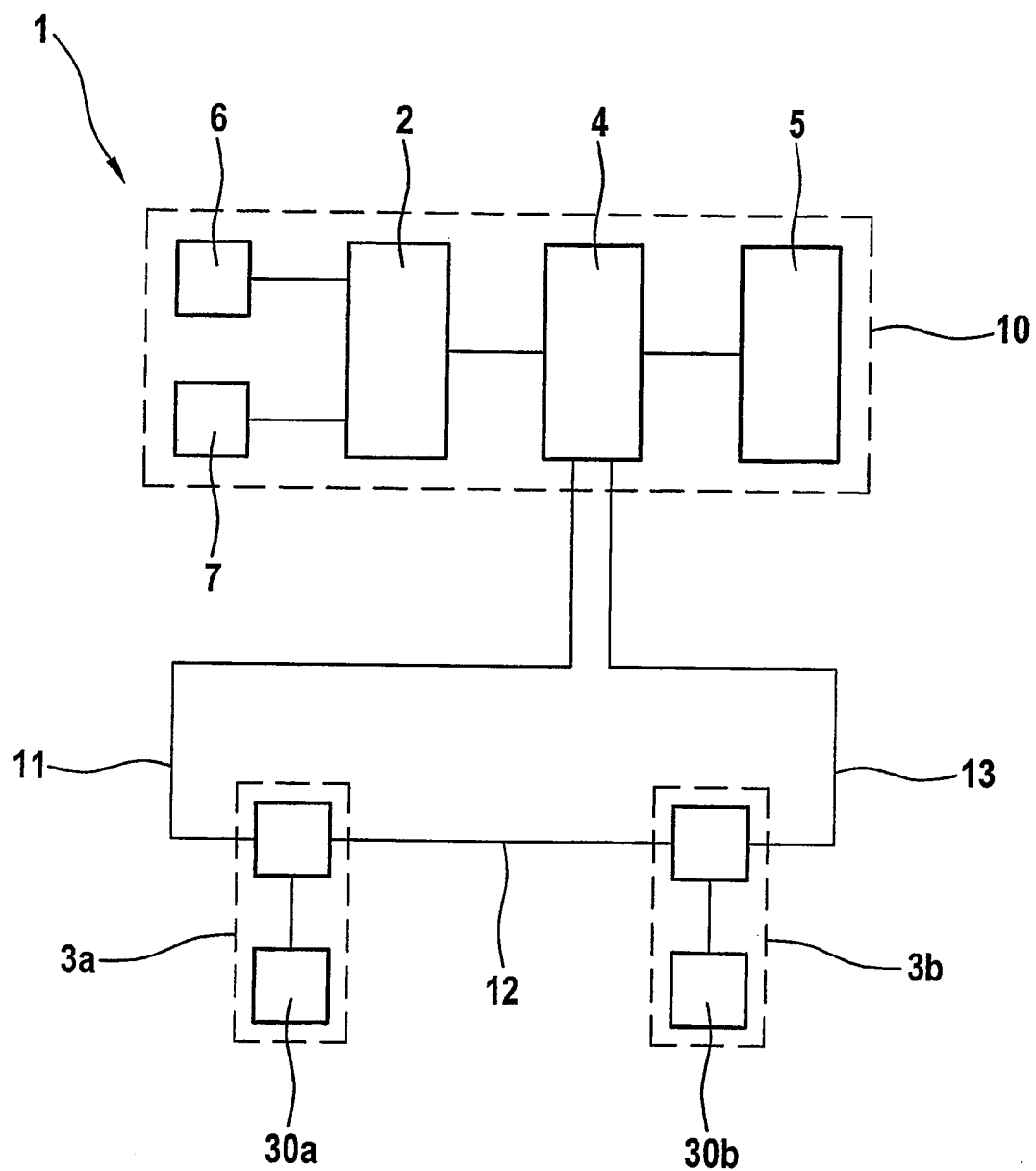

DEVICE FOR DETECTING AND DISPLAYING THE POSITION OF COMPONENTS OF VEHICLE COUPLINGS

BACKGROUND OF THE INVENTION

1. Field of the Invention

The invention relates to a device for detecting and displaying the position of components of vehicle couplings according to the preamble of claim 1.

2. Description of Related Art

A device is known from DE 102 41 904 A1 for displaying the locked status of a fifth-wheel coupling wherein a first sensor is located in the area of the insertion opening of the fifth-wheel coupling to detect the kingpin, and a second sensor comprises a magnetically-sensitive sensor that interacts with a magnet affixed to the control handle, and both sensors contact different actuating mechanisms. The sensors are connected to a display unit in the cab of the semi-trailer truck.

Generally, the signals of the sensors are transmitted and the energy of the sensors is supplied through cable harnesses, and the signals are evaluated by corresponding control electronics. The installation expense for such systems is large, and often stands in poor relationship to the achieved effect, which hinders widespread use of such desirable safety-enhancing features. In U.S. Pat. No. 6,736,420 B2, a displacement device for fifth-wheel couplings is known that has two guide rails with toothed bars on which a carriage is moveably mounted that bears the fifth-wheel coupling. Located on the carriage is a locking device having blocking parts that engage in the toothed bars. One of the blocking parts is connected to an opening lever that in turn can be connected to an actuating device, for example, a pull lever for manual actuation. With this known displacement device, it is also necessary for the driver to visually check that the carriage is properly locked before he starts driving.

Independent of the presence of display mechanisms in the cab, the driver must visually check the vehicle, fifth-wheel coupling, locking device, etc. before driving.

Usually, mechanical locking displays are used that, depending on the design and lighting, are easier or more difficult to read. This can make it much more difficult to check the vehicle before driving and, in an extreme case, can lead to incorrect coupling.

BRIEF SUMMARY OF THE INVENTION

The problem of the invention is therefore to offer an independent device for demonstrating and displaying the position of the components of vehicle couplings that makes it easier to visually inspect these components.

This problem is solved with a device that is characterized in that the display mechanism is affixable to the vehicle coupling or adjacent to the vehicle coupling, and that at least two sensor mechanisms are provided, of which at least one sensor mechanism is arranged at a distance from the display unit.

The advantage of the device is that a display unit is provided that can be placed at the check site and also emits a visual or acoustic signal. No complex wiring is required of the sensor mechanisms to a display mechanism in the cab. An economical display mechanism is therefore provided that can be easily placed near sites to be inspected. When the vehicle coupling is a fifth-wheel coupling, the display mechanism can be located on a mounting element of the fifth-wheel coupling to the chassis, for example to the mounting plate or the chassis itself. The driver can do a visual check while passing by without needing additional tools such as a flashlight, etc. to for example, check the locking of a fifth-wheel coupling or the position of a sliding device.

The actual voltage source that is preferably located in the housing of the display mechanism also contributes to the universal applicability of the device according to the invention. There is no wiring to the vehicle power supply. Batteries, rechargeable batteries, or for example electro-kinematic generators can be used as the voltage source. The sensor mechanisms are releasably connected with each other and/or releasably connected to the display mechanism so that for example, the voltage source can be easily exchanged when servicing without having to remove the sensor mechanisms as well.

The sensor mechanism is preferably connected to the display mechanism wirelessly or with an electric cable.

The sensor mechanism preferably has an energy-saving sensor. The voltage source only needs to be charged or exchanged after a number of years, if at all.

The sensors can be mechanical switches and/or solenoid switches. Reed switches are preferable.

Inductive sensors, magnetic sensors, force sensors or pressure sensors can be used. These sensors preferably operate without contact, whereby electromagnetic sensors are preferred. Depending on the site of use, the sensor mechanism can also have a switch element, especially a mechanical switch element.

Preferably, at least two sensor mechanisms are series-connected. This not only simplifies the wiring, it also reduces the power consumption; however, this does not exclude the possible use of parallel circuits and combinations with series circuits.

The display mechanism preferably has an electronic evaluation unit. This evaluation unit can for example be used to evaluate the sensor signal to determine if the coupling is locked or not (yes/no signal). It can also be used to evaluate the status of the energy supply (for example of a rechargeable battery or non-rechargeable battery).

The display mechanism preferably has a least one visual display element on the housing. This can for example be a lamp, especially an LED display. It is preferable when this visual display element is arranged on the housing such that it is easily perceivable by the driver passing by corresponding to the position of the device on the vehicle.

The display mechanism can exclusively or additionally have an acoustic display element and/or a mechanical display element. The mechanical display element can be a blinker, pins, etc. The acoustic display elements are preferably beepers or buzzers. The display on the display element can be permanent such as a continuous light or tone. The display can also be designed to be impermanent, such as a flashing light, etc.

In particular, the locking status for example of a fifth-wheel coupling is indicated by a visual or acoustic signal. It can also be useful to signal the open position. The type of display that is chosen depends on the type of position of the vehicle components to be detected and/or its arrangement on the vehicle.

When the vehicle coupling is a fifth-wheel coupling, the device according to the invention comprises at least two of the following sensor mechanisms for a fifth-wheel handle, kingpin, semi-trailer, locking hook and locking bolt. It is preferable when the kingpin sensor has a magnetic pin that is actuatable by the kingpin.

Given a device equipped with a semi-trailer sensor, it is for example possible to check the correct position of a semi-trailer on the fifth-wheel coupling. The determined distance from the device to the bottom of the semi-trailer can for example be used to identify if the semi-trailer is in the required position in which the kingpin engages in the locking device of the fifth-wheel coupling.

When the fifth-wheel coupling is on a carriage of a displacement arrangement, the device according to the invention preferably comprises at least two of the following sensor mechanisms for the fifth-wheel handle, position of the carriage and the locking of the displacement device.

When the vehicle coupling is a bolt coupling, the device according to the invention comprises the sensor mechanism of the coupling bolt and the safety lock.

BRIEF DESCRIPTION OF THE SEVERAL VIEWS OF THE DRAWING(S)

Figure 2:
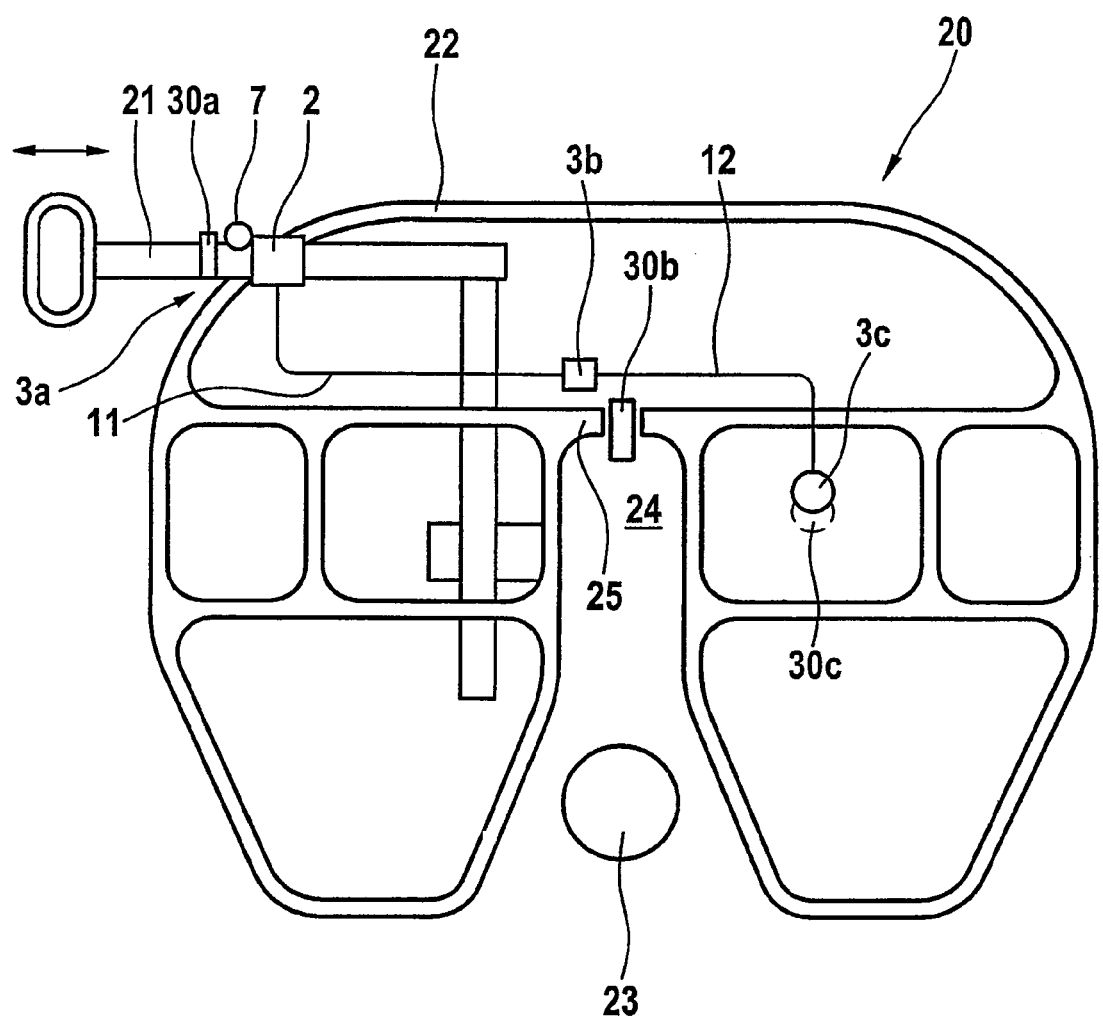
Figure 3:
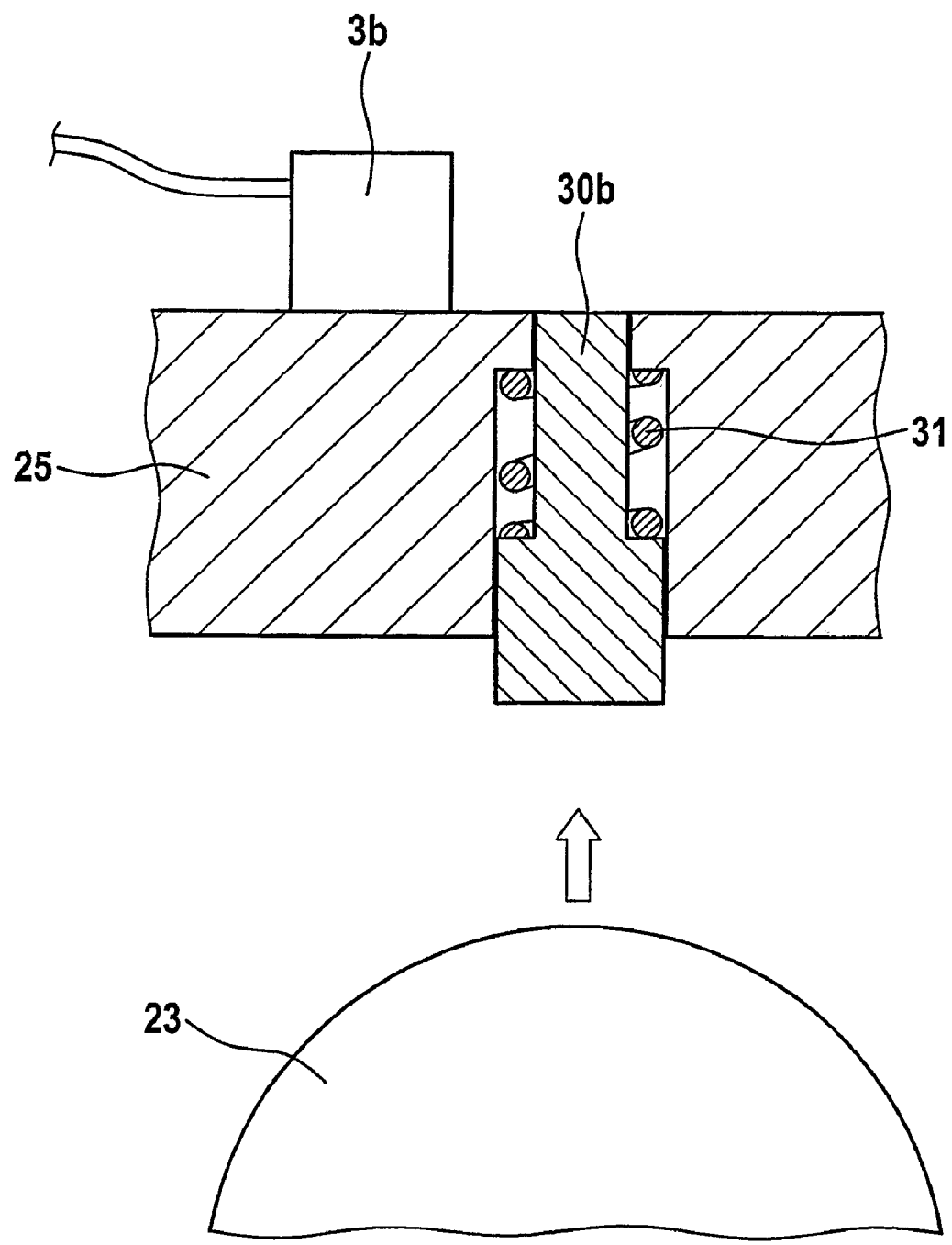
Figure 4:
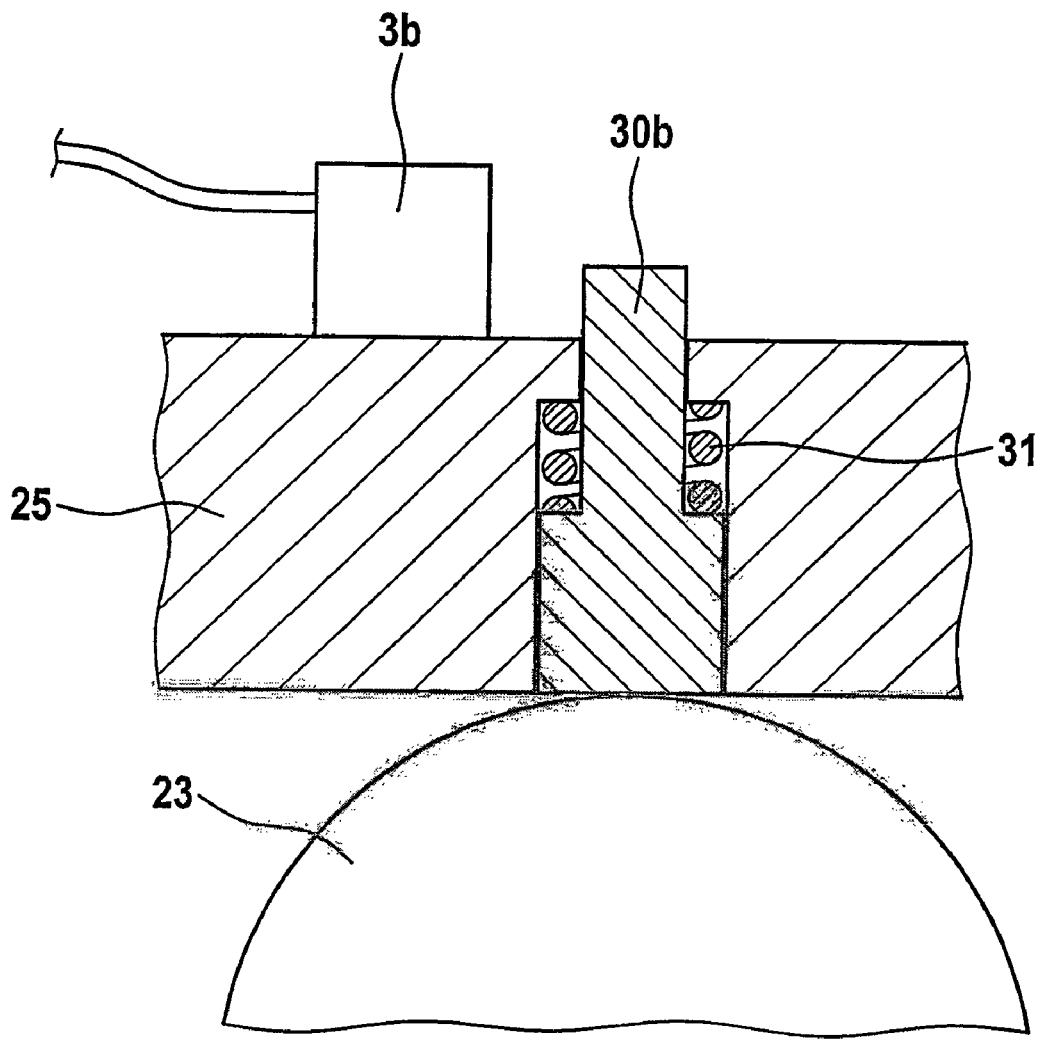
Figure 5:
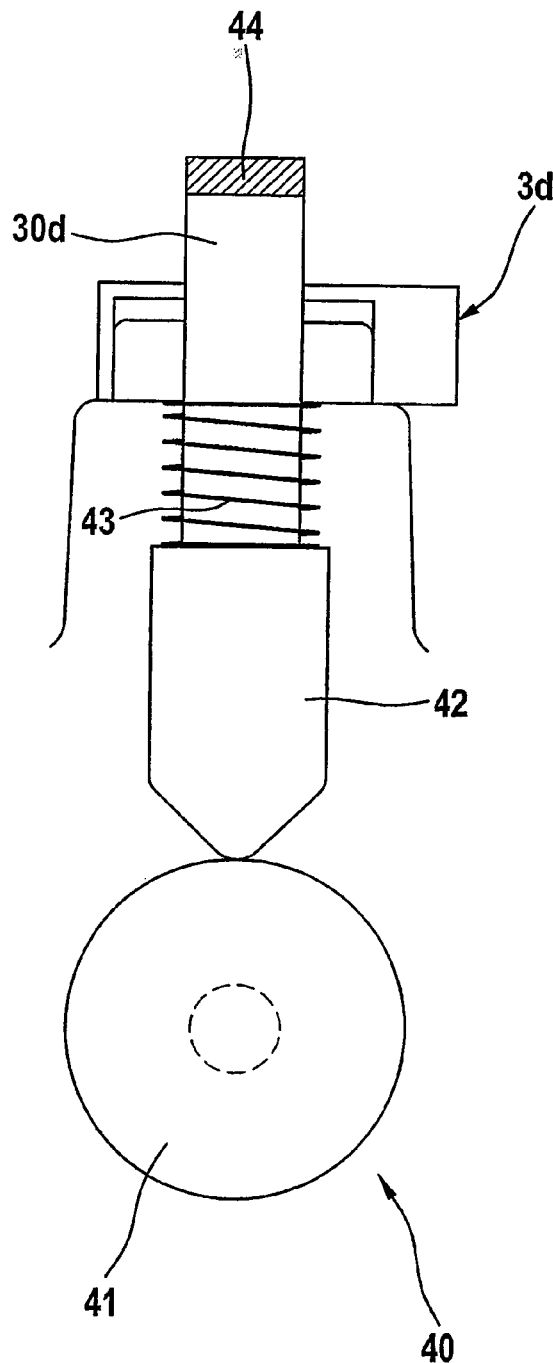
Figure 6:
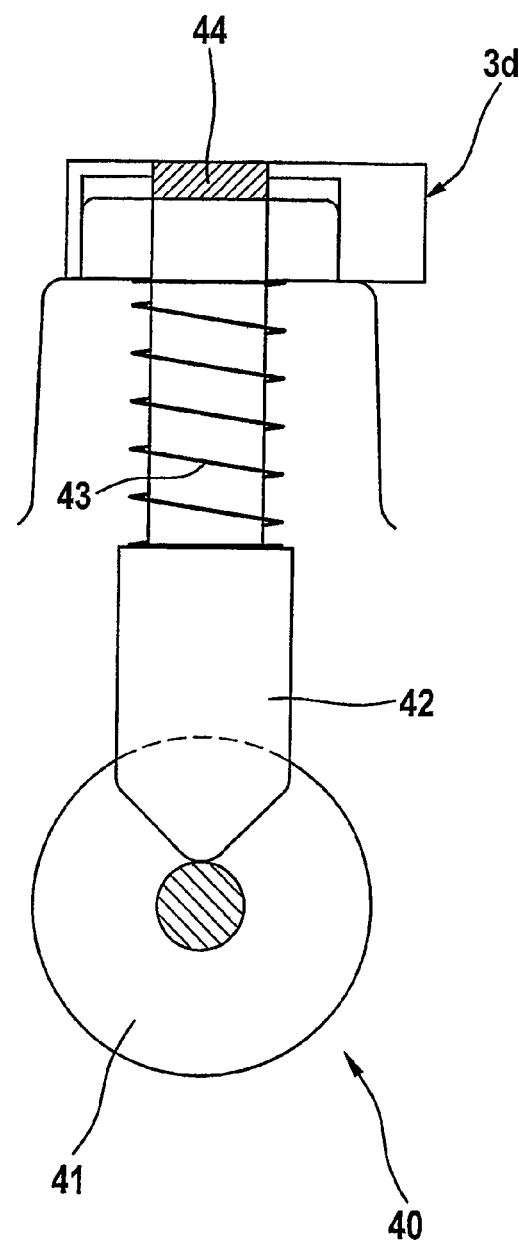

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. Exemplary embodiments of the invention will be further explained below with reference to the drawings. The drawings show:

FIG. 1 A block diagram of the device,

FIG. 2 A bottom view of a fifth-wheel coupling,

FIGS. 3 and 4 Schematic representation of the kingpin sensor,

FIGS. 5 and 6 The sensor of the locking bolt of a bolt coupling, and

Figure 7:
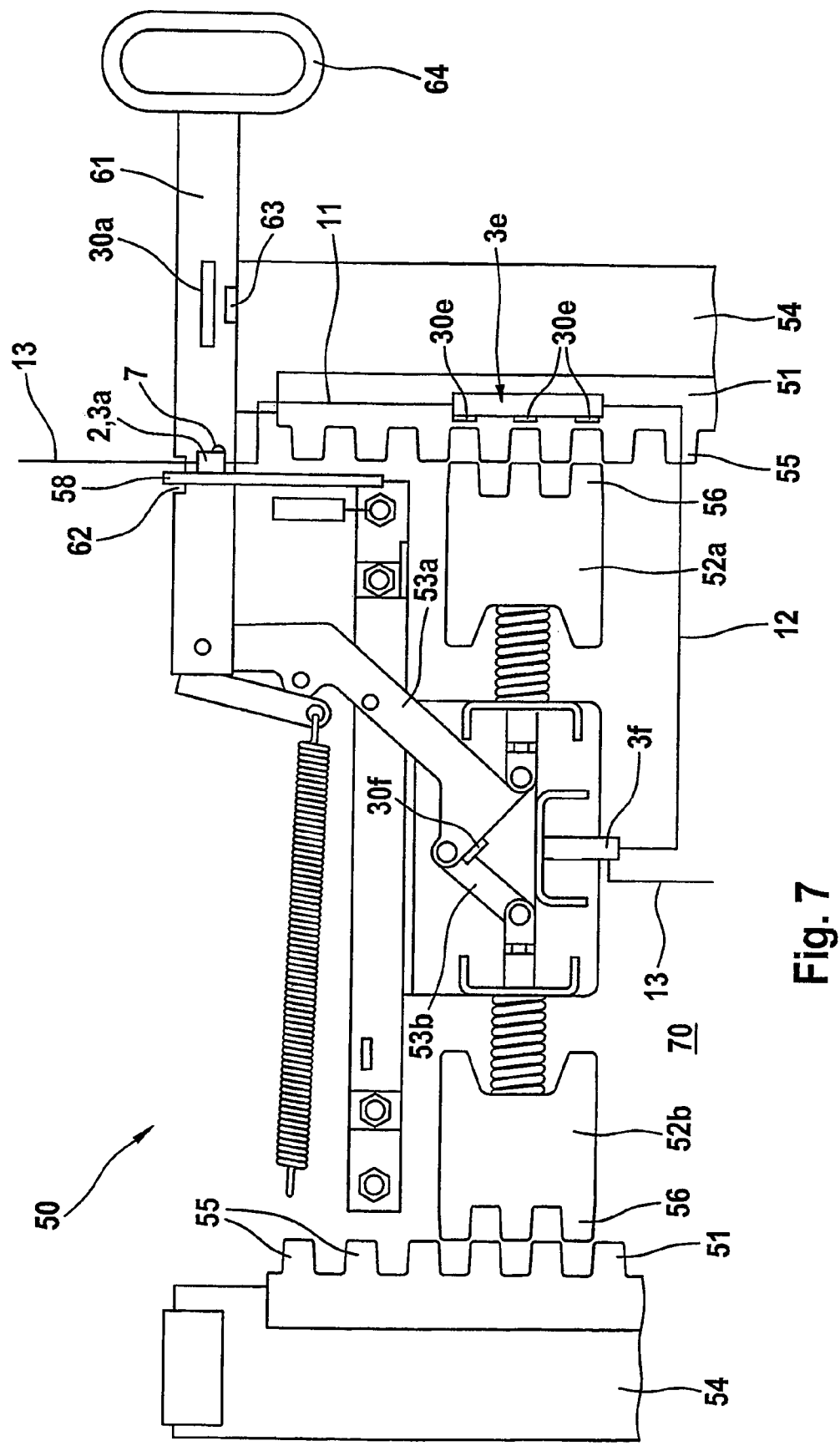
Figure 8:
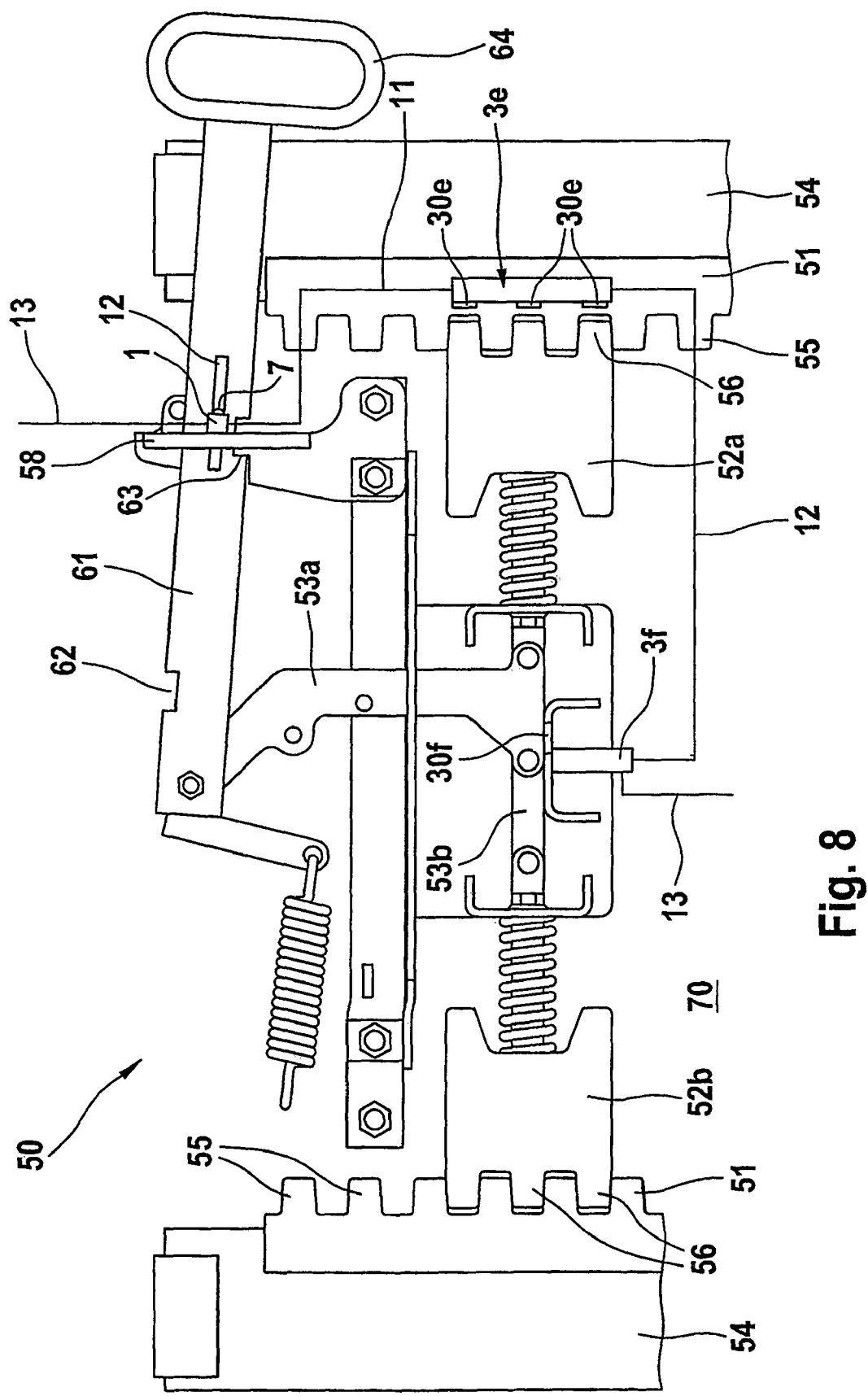

FIGS. 7 and 8 Top view of a displacement device of a fifth-wheel coupling.

DETAILED DESCRIPTION OF THE INVENTION

FIG. 1 shows a block diagram of the device 1 that is in a common housing 10 with a display mechanism 2 having an acoustic display element 6 and a visual display element 7, an evaluation unit 4 and its own voltage source 5. All electronic or electrical components are connected. The evaluation unit 4 is series-connected via cables 11, 12 and 13 with two sensor mechanisms 3a and 3b having sensors 30a and 30b. The sensors can for example be a fifth-wheel handle sensor 30a and a kingpin sensor 30 of a fifth-wheel coupling.

If there is no evaluation unit or it is integrated in the display mechanism 2, the cables 11 and 13 lead from the display mechanism 2.

FIG. 2 schematically portrays a bottom view of a fifth-wheel coupling 20. The coupling plate is structured and possesses a peripheral wall 22 and inter alia a cross brace 25. When the semi-trailer is coupled to a tractor, the kingpin 23 attached to the semi-trailer is inserted in the coupling opening 24. After the kingpin 23 reaches its end position in the opening 24, a locking hook locks it. This locking is usually performed by a fifth-wheel handle 21 and an associated linkage.

A display mechanism 2 is on or in the wall 22 of the fifth-wheel coupling 20, said display mechanism having a visual display element 7 on the outside. This display mechanism is combined with a sensor mechanism 3a to which belongs a fifth-wheel handle sensor 30a that is located on the fifth-wheel handle 21.

When the kingpin 23 is locked or unlocked, the fifth-wheel handle is moved in the direction indicated by the double arrow so that the fifth-wheel handle sensor 30a moves toward the display mechanism 2 and hence toward the sensor mechanism 3a, or it is removed which is also detected by the sensor mechanism 3a. A cable 11 runs from sensor mechanism 3a to sensor mechanism 3b to which the kingpin sensor 30b belongs that is movably mounted in the cross brace 25. The operation of the kingpin sensor 30b will be explained with reference to FIGS. 3 and 4.

Another cable 12 leads from sensor mechanism 3b to sensor mechanism 3c with the semi-trailer sensor 30c. From there, a cable (not shown) leads back to the display mechanism 2. In FIG. 3, the kingpin sensor 30b is portrayed as a magnetic pin that is held in its basic position by means of a pressure spring 31. In this basic position, the kingpin sensor 30b projects in relation to the cross brace 25 so that it can be moved by the kingpin 23 in the direction of the arrow. At the opposite side of the outside of the cross brace 25, there is a sensor mechanism 3b that for example can contain a reed switch.

The closed position is shown in FIG. 4 in which the kingpin 23 has actuated the kingpin sensor 30b so that it is opposite the sensor mechanism 3b. The reed switch of the sensor mechanism 3b is thereby closed, and a corresponding signal is sent to the display mechanism 2. FIGS. 5 and 6 schematically portray a bolt coupling 40 having a coupling bolt 41. FIG. 5 shows the opened position of the coupling bolt 41, whereas FIG. 6 shows the closed position in which the coupling bolt 41 is shifted relative to the locking bolt 42, so that the locking bolt 42 is driven by the pressure spring 43 and engages in a recess in the coupling bolt 41. The locking bolt 42 is connected with a pin at the back, and its free end bears a contact element 44 that forms the sensor 30d. The contact element 44 interacts with the sensor mechanism 3d, and the sensor mechanism 3d also can have a reed switch, for example. The contact element 44 would be a magnetic contact element in this case.

Such a bolt coupling 40 can also have other sensors, for example, a sensor that detects the presence of the coupling bolt, and this sensor mechanism functions like the kingpin sensor. These two sensors are connected to a display mechanism as in the example of the fifth-wheel coupling, said display mechanism being located on the bolt coupling or next to the bolt coupling in an area that is easily visible from the outside.

FIGS. 7 and 8 show a displacement device 50 of a fifth-wheel coupling (not shown). Parallel guide rails 54 with toothed bars 51 and teeth 55 are affixed to a tractor (not shown). The teeth 55 face inward and lie in a common plane.

A carriage 70 is movably mounted on the guide rails 54, and the frame of said carriage is not portrayed in FIGS. 7 and 8.

A locking device with blocking parts 52a,b is on the carriage 70, said blocking devices being connected by means of levers 53a,b to a fifth-wheel handle 61. By means of the fifth-wheel handle 61, these blocking parts 52a,b are moved from an unlocked position (FIG. 7) into a locked position (FIG. 8) and vice versa. The display mechanism 2 with a sensor mechanism 3a is on a wall element 58 through which the fifth-wheel handle 61 is guided. On the top of the fifth wheel handle 61 is a contact element that forms the fifth-wheel handle sensor 30a. In FIG. 7 that shows the unlocked position, the locking recess 62 of the fifth-wheel handle 61 is fixed on the wall element 58. The fifth-wheel handle sensor 30a is outside of the sensor mechanism 3a, and the unlocked position is detected.

When, as shown in FIG. 8, the fifth-wheel handle 61 is inserted and the blocking parts 52a,b assume their locked position, the fifth-wheel handle sensor 30a moves under the sensor mechanism 3a so that it can detect the locked position. The corresponding signal is displayed by the visual display 7.

The fifth-wheel handle 21 is fixed on the wall element 58 by means of its locking recess 63.

In FIGS. 7 and 8, another sensor mechanism 3e is also on the toothed bars 51, said sensor mechanism having three inside position sensors 30e. When the teeth 56 of the blocking piece 52a engage in the gaps between the teeth 55 of the toothed bar 51, they are detected by the position sensors 30e.

The sensor mechanism 3e is connected to the display mechanism 2 by means of the cable 11. In addition, another cable 12 leads to another sensor mechanism 3f near the lever 53a,b. From there, another electrical line 13 leads back to the display mechanism 2. The lever 53a is provided with a magnetic plate 30f as a locking sensor that opposes the sensor mechanism 3f in the position shown in FIG. 8, and the sensor mechanism can also have a reed switch.

REFERENCE NUMBER LIST 1 device
2 display mechanism
3a,b,c,d,e,f sensor mechanism
4 evaluation unit
5 voltage source
6 acoustic display element
7 visual display element
10 housing
11 cable
12 cable
13 cable
20 fifth-wheel coupling
21 fifth-wheel handle
22 peripheral wall
23 kingpin
24 coupling opening
25 cross brace
30a fifth-wheel handle sensor
30b kingpin sensor
30c semi-trailer insert
30d locking bolt sensor
30e position sensor
30f locking sensor
31 pressure spring
40 bolt coupling
41 coupling bolt
42 safety bolt
43 pressure spring
44 contact element
50 displacement device
51 toothed bar
52a,b blocking part
53a,b lever
54 guide rail
55 tooth
56 tooth
58 wall element
61 fifth-wheel handle
62 lock recess
63 lock recess
70 carriage It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An independent device to detect and display the position of components of a vehicle coupling, the device comprising
   (a) a display mechanism;
   (b) its own voltage source; and
   (c) sensor mechanisms,
   wherein the display mechanism is attachable to or adjacent to the vehicle coupling and at least two sensor mechanisms are provided of which at least one sensor mechanism is at a distance from the display mechanism, wherein the display mechanism is provided with connections only to the sensor mechanisms.

2. The device according to claim 1, wherein the sensor mechanism is connected to the display mechanism wirelessly or with an electric wire.

3. The device according to claim 1, wherein the sensor mechanism has an energy-saving sensor.

4. The device according to claim 1, wherein the sensor is a mechanical switch and/or a solenoid switch.

5. The device according to claim 1, wherein the sensor is a reed switch.

6. The device according to claim 1, wherein at least two sensor mechanisms are series-connected.

7. The device according to claim 1, wherein the display mechanism has an electronic evaluation unit.

8. The device according to claim 1, characterized in that the display mechanism has a visual display element.

9. The device according to claim 1, wherein the display mechanism has an acoustic display element.

10. The device according to claim 1, wherein the display mechanism has a mechanical display element.

11. The device according to claim 1, wherein the sensor mechanisms are releasably connected with each other and/or releasably connected with the display mechanism.

12. The device according to claim 1, wherein the vehicle coupling is a fifth-wheel coupling, and wherein the vehicle coupling comprises at least two of the following sensor mechanisms for a fifth-wheel handle, kingpin, semi-trailer, locking hook and locking bolt.

13. The device according to claim 1, wherein the vehicle coupling is a fifth wheel coupling that is on a carriage of a displacement device, wherein it comprises at least two of the following sensor mechanisms for a fifth-wheel handle, position of the skid and locking of the displacement device.

14. The device according to claim 1, wherein the vehicle coupling is a bolt coupling, wherein it comprises the sensor mechanisms of the coupling bolt and the locking bolt.

15. An independent device to detect and display the position of components of a vehicle coupling, the device comprising
   (a) a display mechanism;
   (b) its own voltage source; and
   (c) sensor mechanisms,
   wherein the voltage source of the device provides power to the display mechanism and the sensor mechanisms;
   the display mechanism is attachable to or adjacent to the vehicle coupling; and
   at least two sensor mechanisms are provided of which at least one sensor mechanism is at a distance from the display mechanism.

* * * * *